United States Patent
Clerckx et al.

(10) Patent No.: US 8,649,455 B2
(45) Date of Patent: Feb. 11, 2014

(54) MULTIPLE INPUT MULTIPLE OUTPUT COMMUNICATION SYSTEM AND COMMUNICATION METHOD OF ADAPTABLY TRANSFORMING CODEBOOK

(75) Inventors: Bruno Clerckx, Yongin-si (KR); Ki Il Kim, Seongnam-si (KR); Keun Chul Hwang, Yongin-si (KR); Sung Woo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 638 days.

(21) Appl. No.: 12/581,201

(22) Filed: Oct. 19, 2009

(65) Prior Publication Data

US 2010/0098144 A1  Apr. 22, 2010

Related U.S. Application Data

(60) Provisional application No. 61/106,650, filed on Oct. 20, 2008.

(30) Foreign Application Priority Data

Sep. 11, 2009  (KR) ........................ 10-2009-0085724

(51) Int. Cl.
*H04B 7/02* (2006.01)
(52) U.S. Cl.
USPC ........... 375/267; 375/260; 375/299; 375/347; 375/349

(58) Field of Classification Search
USPC .......... 375/267, 260, 299, 347, 349; 340/905, 340/994, 522, 309.15; 701/204, 207, 213
See application file for complete search history.

(56) References Cited

U.S. PATENT DOCUMENTS

| | | | | |
|---|---|---|---|---|
| 2006/0094373 A1* | 5/2006 | Hottinen | ......................... | 455/73 |
| 2008/0198836 A1* | 8/2008 | Sun | ............................... | 370/350 |
| 2010/0027713 A1* | 2/2010 | Huang et al. | .................. | 375/296 |

\* cited by examiner

*Primary Examiner* — Kabir A Timory
(74) *Attorney, Agent, or Firm* — NSIP Law

(57) ABSTRACT

A multiple input multiple output (MIMO) communication system including a base station and at least one terminal may adaptively transform a codebook. The terminal may calculate one or more correlation matrices based on one or more sub-channel matrices included in a channel matrix. The terminal may feed back information for the base station to reconstruct the one or more correlation matrices. The terminal may transform a codebook stored in the memory of the terminal, based on the one or more correlation matrices. The base station may verify the one or more correlation matrices using the information for the base station to reconstruct the one or more correlation matrices. The base station may transform a codebook stored in the memory of the base station such that the transformed base station codebook is the same as the transformed terminal codebook.

23 Claims, 5 Drawing Sheets

MULTIPLE INPUT MULTIPLE OUTPUT COMMUNICATION SYSTEM AND COMMUNICATION METHOD OF ADAPTABLY TRANSFORMING CODEBOOK

CROSS-REFERENCE TO RELATED APPLICATIONS

This application claims the benefit under 35 U.S.C. §119 (e) of a U.S. Provisional Application No. 61/106,650, filed Oct. 20, 2008, and the benefit under 35 U.S.C. §119(a) of a Korean Patent Application No. 10-2009-0085724, filed Sep. 11, 2009, in the Korean Intellectual Property Office, the entire disclosures of which are incorporated herein by reference for all purposes.

BACKGROUND

1. Field

The following description relates to a multiple input multiple output (MIMO) communication system, a codebook and a method of adaptably transforming the codebook.

2. Description of the Related Art

Studies are being conducted on various types of multimedia services such as voice services that can support high quality and high speed data transmission in a wireless communication environment. Technologies associated with a multiple input multiple output (MIMO) communication system using multiple channels in a spatial area are in rapid development.

In a MIMO communication system, a base station and terminals may use a codebook. A particular space may be quantized into a plurality of vectors or matrices. The plurality of vectors and/or matrices that are generated by quantizing the particular space may be stored in the base station and the terminals as the codebook.

For example, a terminal may select any one codeword from a plurality of codewords included in the codebook. The selected codeword may be based on a channel that is formed between the base station and the terminal. The base station may also recognize the selected codeword based on the codebook. The selected codeword may be used as a beamforming vector to generate a transmission signal between the base station and the terminal.

The design of a codebook is an important issue in the MIMO communication system. For example, it may be effective to design the codebook to be consistent with a variable channel environment. In particular, even in an environment where there is some constraint on a number of feedback bits, it is possible to enhance a throughput of the MIMO communication system, and to decrease a quantization error using a codebook.

SUMMARY

In one general aspect, there is provided a communication method of a receiver, the method including calculating a channel matrix between the receiver and a transmitter, calculating one or more correlation matrices corresponding to the channel matrix between the receiver and the transmitter, and feeding back information for the transmitter to recognize the one or more correlation matrices.

The calculating a channel matrix may further include decomposing the channel matrix into at least two subchannels, and the calculating comprises calculating at least two correlation matrices that correspond to the at least two subchannel matrices.

The decomposing may include decomposing the channel matrix into the at least two subchannel matrices is based on at least one of the polarization of one or more transmit antennas installed in the transmitter, and the polarization of one or more receive antennas installed in the receiver.

The method may further include decomposing each of the one or more correlation matrices into a plurality of sub blocks, normalizing a power of the sub blocks included in each of the one or more correlation matrices using normalization factors, and feeding back to the transmitter information associated with the normalization factors.

The method may further include unifying the normalization factors into at least one value to generate information associated with the normalization factors.

The method may further include generating information for the transmitter to reconstruct the at least two correlation matrices that are associated with a plurality of sub blocks included in each of the at least two correlation matrices.

The generating may include calculating a sum or an average between a plurality of sub blocks included in a particular correlation matrix, and another plurality of sub blocks included in at least one other correlation matrix, to generate information for the transmitter to reconstruct the at least two correlation matrices.

The generating may include generating information for the transmitter to reconstruct the at least two correlation matrices using a symmetry of each of the at least two correlation matrices.

The feeding back may include feeding back information for the transmitter to reconstruct the one or more correlation matrices so that the transmitter transforms a first codebook to a second codebook.

The method may further include transforming a first codebook to a second codebook using the one or more correlation matrices.

The method may further include selecting a preferred vector or a preferred matrix using the second codebook, and feeding back to the transmitter information associated with the preferred vector or the preferred matrix.

In another general aspect, there is provided a communication method of a transmitter, the method including receiving information for the transmitter to reconstruct one or more correlation matrices corresponding to a channel matrix between a receiver and the transmitter, recognizing the one or more correlation matrices using the information received for the transmitter to reconstruct the one or more correlation matrices, and transforming a first codebook to a second codebook using the one or more correlation matrices.

The method may further include generating a precoding matrix using the second codebook.

The receiving may include receiving information for the transmitter to reconstruct at least two correlation matrices corresponding to at least two subchannel matrices included in a channel matrix, and the recognizing comprises recognizing the at least two correlation matrices.

The recognizing may include recognizing the at least two correlation matrices using a symmetry of each of the at least two correlation matrices.

The information for the transmitter to reconstruct the at least two correlation matrices may be associated with a sum or an average between a plurality of sub blocks, included in a particular correlation matrix, and another plurality of sub blocks, included in at least one other correlation matrix.

The method may further include receiving information associated with normalization factors that are used to normalize a plurality of sub blocks included in each of the one or more correlation matrices.

Information associated with the normalization factors may be associated with at least one value used to unify the normalization factors.

In still another general aspect, there is provided a computer-readable recording medium storing a program to implement a method including calculating a channel matrix between a receiver and a transmitter, calculating one or more correlation matrices corresponding to the channel matrix between the receiver and the transmitter, and feeding back information for the transmitter to recognize the one or more correlation matrices.

In yet another general aspect, there is provided a receiver including a channel matrix calculator to calculate a channel matrix, a correlation matrix calculator to calculate one or more correlation matrices corresponding to the channel matrix between the receiver and a transmitter, and a feedback unit to feed back information for the transmitter to reconstruct the one or more correlation matrices.

The channel matrix calculator may calculate a channel matrix and decomposes the channel matrix into at least two subchannel matrices.

The receiver may further include a power normalization unit to normalize a power of sub blocks included in each of the one or more correlation matrices using normalization factors, wherein the feedback unit feeds back information associated with the normalization factors.

The receiver may further include an information generator to generate information for the transmitter to reconstruct the one or more correlation matrices that are associated with a plurality of sub blocks included in each of the one or more correlation matrices.

The receiver may further include a codebook transformation unit to transform a first codebook to a second codebook using the one or more correlation matrices.

The receiver may further include a selector to select a preferred vector or a preferred matrix using the second codebook, wherein the feedback unit feeds back, to the transmitter, information associated with the preferred vector or the preferred matrix.

Where codewords included in the first codebook include at least two vectors, the codebook transformation unit may transform the first codebook to the second codebook by making at least two correlation matrices of the one or more correlation matrices, correspond to the at least two vectors.

In still yet another general aspect, there is provided a transmitter including an information receiver to receive information for the transmitter to reconstruct one or more correlation matrices corresponding to a channel matrix between a receiver and the transmitter, a correlation matrix recognition unit to recognize the one or more correlation matrices using the information for the transmitter to reconstruct the one or more correlation matrices, and a codebook transformation unit to transform a first codebook to a second codebook using the at least two correlation matrices.

The transmitter may further include a precoder to generate a precoding matrix using the second codebook.

Where codewords included in the first codebook include at least two vectors, the codebook transformation unit may transform the first codebook to the second codebook by making at least two correlation matrices of the one or more correlation matrices, correspond to the at least two vectors, respectively.

Other features and aspects will be apparent from the following detailed description, the drawings, and the claims.

Figure 1:
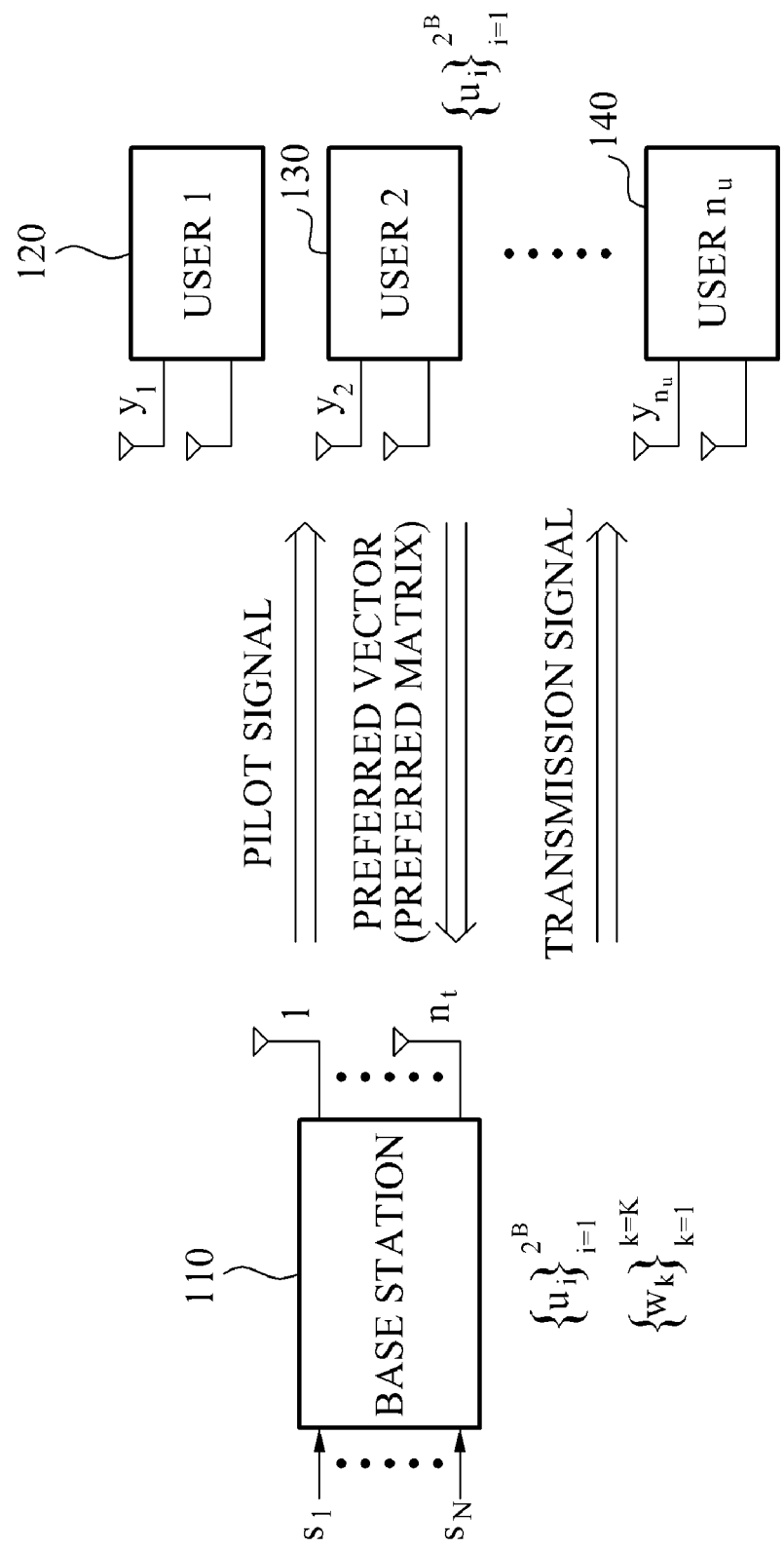
FIG. 1 is a diagram illustrating an exemplary multi-user multiple input multiple output (MIMO) communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions may be omitted for increased clarity and conciseness.

Hereinafter, exemplary embodiments will be described in detail with reference to the accompanying drawings.

FIG. 1 illustrates an exemplary multi-user multiple input multiple output (MIMO) communication system.

The multi-user MIMO communication system includes a base station 110, and a plurality of users (user 1, user 2, user $n_u$) 120, 130, and 140. As referred to herein, a user is the same as a terminal. In this exemplary system a plurality of users are present, but it will be appreciated that only one user may be present in the system. One or more antennas may be installed in the base station 110. A single antenna or a plurality of antennas may be installed in each of the plurality of users 120, 130, and 140. Channels may be formed between the base station 110 and each of the users 120, 130, and 140. For example, a channel may be formed between base station 110 and user 120, a channel may be formed between base station 110 and user 130, and a channel may be formed between base station 110 and channel 140. The base station 110 may communicate with the users 120, 130, and 140 via the formed channels.

The base station 110 may transmit at least one data stream to the plurality of users 120, 130, and 140. The base station 110 may perform beamforming for the data streams according to a spatial division multiplex access (SDMA) scheme to thereby generate a transmission signal. The base station 110 may generate a precoding matrix based on a codebook, and generate a transmission signal based on the generated precoding matrix.

The base station 110 may transmit a well-known signal such as a pilot signal to the plurality of users 120, 130, and 140 via downlink channels. The users 120, 130, and 140 may receive the pilot signal to estimate a channel $H_k$ that is formed between the base station 110 and each individual user 120, 130, and 140. In this example, k denotes a user index. The users 120, 130, and 140 may select, as a preferred vector or a preferred matrix $$\{u_i\}_{i=1}^{2^B},$$

any codeword from a codebook including a plurality of codewords, based on the estimated channel $H_k$. For example, the codebook may include a plurality of vectors for a case where a communication rank is 1, and may include a plurality of matrices for a case where the transmission rank is greater than 1. In $$\{u_i\}_{i=1}^{2^B},$$

$u_i$ denotes an $i^{th}$ codeword included in the codebook, and B denotes a number of feedback bits. Where the number of feedback bits is B bits, $2^B$ codewords may be generated by quantizing a space and the codewords may be stored in the codebook.

The users 120, 130, and 140 may select, as the preferred vector or the preferred matrix $\{u_i\}_{i=1}^{2^B}$, any one vector or matrix from the $2^B$ codewords, based on various types of conditions.

For example, the users 120, 130, and 140 may select, as the preferred vector or the preferred matrix $\{u_i\}_{i=1}^{2^B}$, any one codeword from the $2^B$ codewords, based on an achievable data transmission rate or a signal-to-interference and noise ratio (SINR). The users 120, 130, and 140 may also determine the user's own preferred transmission rank. In this example, the transmission rank denotes a number of data streams. For example, a user having the transmission rank greater than 1 may select the preferred matrix. A user having the transmission rank 1 may select the preferred vector.

The users 120, 130, and 140 may feed back, to the base station 110, information associated with the selected preferred vector or the preferred matrix $\{u_i\}_{i=1}^{2^B}$. Information associated with the preferred vector or the preferred matrix may be referred to as channel direction information (CDI).

The base station 110 may receive information associated with the preferred vector or the preferred matrix $\{u_i\}_{i=1}^{2^B}$ received from the users 120, 130, and 140, and may determine a precoding matrix $\{W_k\}_{k=1}^{k=K}$. The base station 110 may select one or more of the users 120, 130, and 140 according to various types of user selection algorithms, for example, a semi-orthogonal user selection (SUS) algorithm, a greedy user selection (GUS) algorithm, and the like.

The same codebook that is stored in the plurality of users 120, 130, and 140, may be stored in the base station 110.

The base station 110 may determine the precoding matrix $\{W_k\}_{k=1}^{k=K}$ from the stored codebook, based on information associated with the preferred vector or the preferred matrix $\{u_i\}_{i=1}^{2^B}$ that is received from the plurality of users 120, 130, and 140. For example, the base station 110 may determine the precoding matrix $\{W_k\}_{k=1}^{k=K}$ to maximize a total data transmission rate, that is, a sum rate.

The base station 110 may precode data streams $S_1$ and $S_N$ based on the determined precoding matrix $\{W_k\}_{k=1}^{k=K}$ to generate the transmission signal. A process of generating the transmission signal by the base station 110 may be referred to as "beamforming."

The channel environment between the base station 110 and the plurality of users 120, 130, and 140 may be variable.

Where the base station 110 and the plurality of users 120, 130, and 140 use a fixed codebook, it may be difficult to adapt to the varying channel environment. For example, where the codebook is fixed, the plurality of users 120, 130, and 140 may feed back, to the base station 110, information associated with the preferred vector or the preferred matrix. Based on this information, the base station 110 may determine a set of users and a matrix made of selected vectors that is most appropriate for the channel environment at that time. However, the channel environment is not always a stable environment, for example, because of user mobility, removal of users, addition of users, and various other factors. Thus, the channel environment may change to a point where the set of users selected and the matrix of vectors selected is no longer the most appropriate.

Accordingly, there is a need for technology that may adaptively cope with the channel environment to enhance a performance of the multi-user MIMO communication system.

Figure 2:
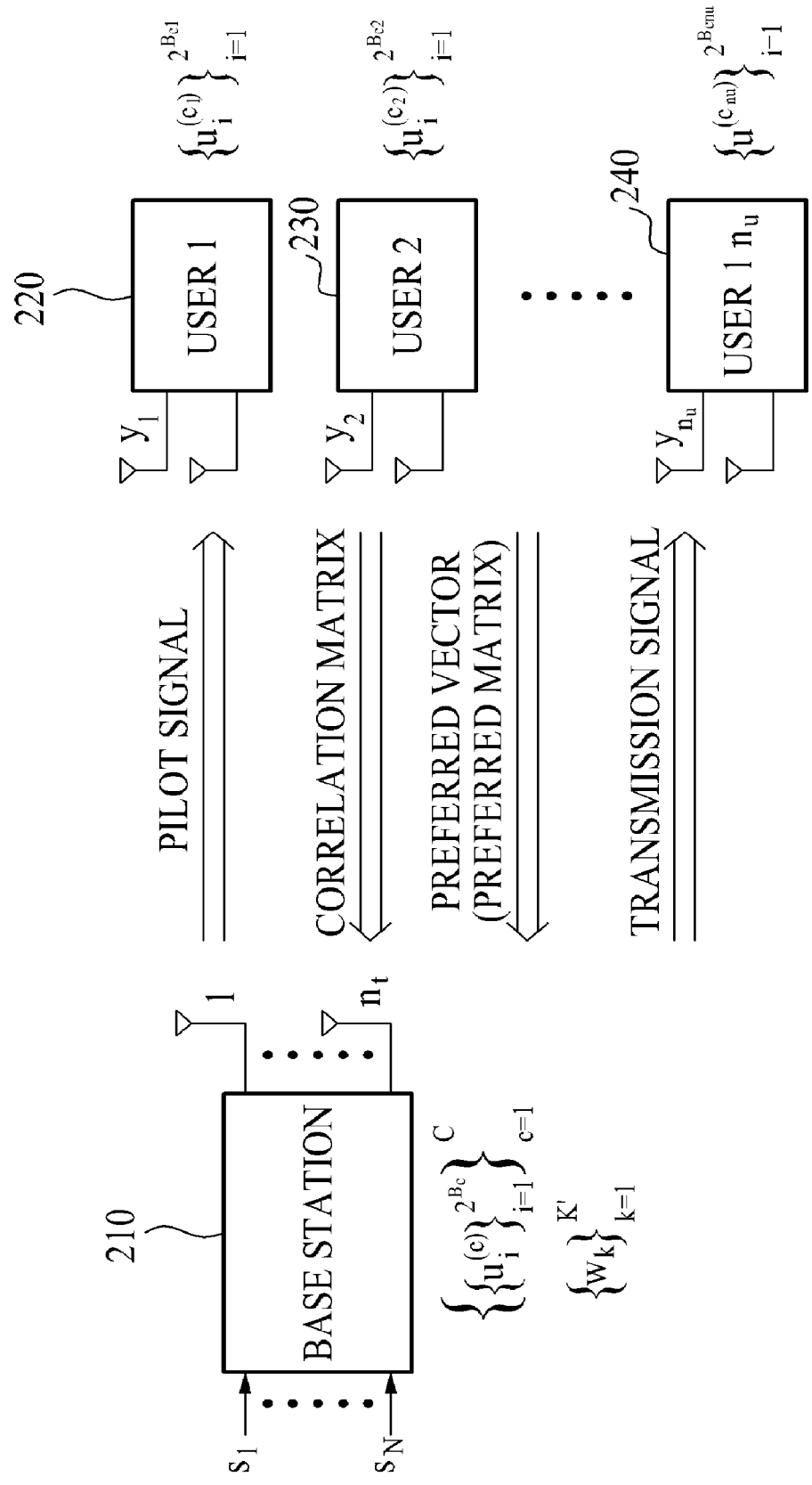
FIG. 2 is a conceptual diagram illustrating another exemplary multi-user MIMO communication system.

FIG. 2 illustrates a conceptual diagram of a multi-user MIMO communication system according to an exemplary embodiment.

The multi-user MIMO communication system includes a base station 210 and a plurality of users (user 1, user 2, user $n_u$) 220, 230, and 240.

As described above with reference to FIG. 1, the base station 210 may transmit pilot signals to the plurality of users 220, 230, and 240. The users 220, 230, and 240 may estimate channels, formed between the base station and each individual user 220, 230, and 240, based on the pilot signal, and may calculate a channel matrix $H_k$, where k denotes a user index.

The users 220, 230, and 240 may calculate a correlation matrix $R_k$ of the channel matrix $H_k$ based on the calculated channel matrix $H_k$. The correlation matrix $R_k$ may be calculated as illustrated by the following Equation 1:

$$R_k(t) = \frac{1}{T} \sum_{j=0}^{T} H_k^H(t-j) H_k(t-j), \tag{1}$$

where $H_k(t)$ denotes a channel matrix of a channel that is estimated in a time t and T denotes a time slot corresponding to a calculation target of the correlation matrix $R_k$.

Averaging over the frequency domain is illustrated in the following Equation 1-1:

$$R_k(t) = \frac{1}{T} \frac{1}{F} \sum_{f=0}^{F} \sum_{j=0}^{T} H_k^H(t-j, f) H_k(t-j, f). \tag{1-1}$$

In this example, $H_k(t,f)$ denotes the channel matrix at time t and frequency f.

It can be known from the above Equation 1 and Equation 1-1 that the correlation matrix $R_k$ expresses a statistical characteristic with respect to a change of the channel matrix $H_k$. Where the statistical characteristic with respect to the change of the channel matrix $H_k$ is known, adapting a codebook according to the change of the channel matrix $H_k$ may decrease a quantization error and may also enhance a performance of the MIMO communication system in comparison to the fixed codebook.

In this example, the users 220, 230, and 240 may verify the varying channel environment based on the calculated correlation matrix $R_k$, and adaptively change the codebook based on the verified channel environment based on the calculated correlation matrix. For example, a first codebook used by the base station 210 and the plurality of users 220, 230, and 240 may be transformed to a second codebook based on the correlation matrix $R_k$.

The codebook used by the users 220, 230, and 240, and the base station 210 may be transformed using various types of schemes based on the correlation matrix $R_k$. For example, the users 220, 230, and 240 may calculate the correlation matrix $R_k = E\{H_k^H H_k\}$ as illustrated by the above Equation 1, and may feed back, to the base station 210, information associated with the calculated correlation matrix $R_k$. In this example, $E\{x\}$ denotes an expectation of x. In this example, the users 220, 230, and 240 may transform a base codebook C to a transformed codebook $T(R_k, C)$. The base codebook C corresponds to a well-known fixed codebook. The base station 210 may verify the correlation matrix $R_k$ based on information associated with the correlation matrix $R_k$, and may generate the same codebook as the transformed codebook $T(R_k, C)$ that is included in each of the users 220, 230, and 240.

The users 220, 230, and 240, and the base station 210 may verify a statistical characteristic of a channel by calculating a correlation matrix according to the aforementioned scheme, and may adaptively use the transformed codebook $T(R_k, C)$ based on the verified statistical characteristic of the channel that may be applied to the channel matrix $H_k$ having $f=N(0, R)$. The channel matrix $H_k$ may be Rayleigh fading having $f=N(0, R)$.

In some embodiments, the statistical characteristic of the channel is not the Rayleigh fading, but is rather Ricean fading where the channel matrix $H_k$ has $N(\overline{H}, R_t)$. When Ricean fading is used, or where antennas are dual polarized, it may be inappropriate to use the correlation matrix, calculated according to the aforementioned scheme, in order to generate the adaptively transformed codebook.

A dual polarized channel example is explained below. N(a, b) denotes a normal distribution with an average a and a variance b. Where transmit antennas installed in the base station 210, or receive antennas installed in the users 220, 230, and 240 are dual polarized, a channel matrix H of a particular user may be modeled to $$H = \begin{bmatrix} H_{w,11} & \sqrt{\chi} H_{w,12} \\ \sqrt{\chi} H_{w,21} & H_{w,22} \end{bmatrix}.$$

In this example, $\chi$ denotes a value that is in inverse proportion to a cross polarization discrimination value (XPD), and $0 \leq \chi \leq 1$. The channel matrix H may have an independent but non-identical distribution. A corresponding correlation matrix may be calculated using $R = E\{H^H H\} = (1+\chi)I_{n_t}$. The correlation matrix of the channel may be expressed as real-number folds of a unitary matrix. Therefore, although the base codebook C is transformed based on the correlation matrix, a channel characteristic of the dual polarization may be barely reflected. Accordingly, it may be inappropriate to apply the aforementioned codebook transformation scheme to a dual-polarized channel.

Hereinafter, a codebook transformation scheme applicable to a Rayleigh fading channel and the dual-polarized channel will be described in detail.

Calculation of a Correlation Matrix

As described above, where a channel matrix between a base station and a particular terminal is H, to calculate a correlation matrix using the above Equation 1 in order to transform a codebook may not have an effective result at all times.

Channel Estimation:

A terminal may estimate a channel between the terminal and a base station using a well-known signal transmitted from the base station.

Labeling:

The terminal may label transmit antennas of the base station or receive antennas of the terminal according to each polarization.

For example, in a dual-polarization case, among $n_r$ receive antennas, indexes of receive antennas corresponding to one polarization, for example, a vertical polarization may be listed from 1 through $n_r/2$. Indexes of receive antennas corresponding to another polarization, for example, a horizontal polarization may be listed from $n_r/2+1$ through $n_r$. Where the receive antennas are single-polarized, the indexes of the receive antennas may not need to be labeled using a particular scheme or in a particular order. For example, the receive antennas may be randomly grouped into two groups. The receive antennas corresponding to 1 through $n_r/2$ may be mapped to one group list, and the receive antennas corresponding to $n_r/2+1$ through $n_r$ may be mapped to another group list. Also, among $n_t$ transmit antennas, indexes of transmit antennas corresponding to one polarization, for example, the vertical polarization may be listed from 1 through $n_t/2$. Indexes of transmit antennas corresponding to another polarization, for example, the horizontal polarization may be listed from $n_t/2+1$ through $n_t$. Where the transmit antennas are single-polarized, the indexes of the transmit antennas may not need to be labeled using a particular scheme or in a particular order. For example, the transmit antennas may be randomly grouped into two groups. The transmit antennas corresponding to 1 through $n_t/2$ may be mapped to one group list, and the transmit antennas corresponding to $n_t/2+1$ through $n_t$ may be mapped to another group list.

Construction of a Channel Matrix:

Where the transmit antennas of the base station or the receive antennas of the terminal are labeled according to each polarization, the terminal may construct a channel matrix H including two subchannel matrices, as illustrated by the following Equation 2. In this example, the channel matrix H including at least two subchannel matrices may be represented as:

$$H = \begin{bmatrix} H_1 \\ H_2 \end{bmatrix}. \quad (2)$$

In this example, an element corresponding to an $i^{th}$ row and a $j^{th}$ column of H denotes a channel coefficient between a receive antenna of an index i and a transmit antenna of an index j.

Calculating of at Least Two Correlation Matrices:

Where the channel matrix including at least two subchannel matrices are constructed as shown in the above Equation 2, the terminal may calculate a correlation matrix corresponding to each of the at least two subchannel matrices.

For example, a correlation matrix $R_1$ corresponding to a subchannel matrix $H_1$ and a correlation matrix $R_2$ corresponding to a subchannel matrix $H_2$ may be calculated as illustrated by the following Equation 3:

$$R_1 = E\{H_1^H H_1\}$$

$$R_2 = E\{H_2^H H_2\} \quad (3).$$

Where the transmit antennas are single-polarized, $R_1 \approx R_2$.

Feedback of a Correlation Matrix

Where one or more correlation matrices are calculated, information for the base station (BS) transmitter to reconstruct the one or more correlation matrices may need to be fed back from a terminal to a base station. For example, the terminal may obtain a transformed codebook based on the one or more correlation matrices. The base station may verify the one or more correlation matrices based on information for the BS transmitter to reconstruct the one or more correlation matrices, and may obtain the same transformed codebook.

According to an exemplary embodiment, the terminal may provide technology that may effectively feed back information for the BS transmitter to reconstruct the one or more correlation matrices.

In an exemplary embodiment, two correlation matrices $R_1$ and $R_2$ are calculated. The terminal may quantize the correlation matrix $R_1$ and the correlation matrix $R_2$, and feed back, to the base station, information associated with the quantized correlation matrix $R_1$ and the correlation matrix $R_2$. The above scheme may need a great amount of feedback overheads. In particular, in many scenarios, $R_1 \approx R_2$ and thus it may be ineffective to quantize the correlation matrix $R_1$ and the correlation matrix $R_2$, and to feed back, to the base station, the entire information associated with both the correlation matrix $R_1$ and the correlation matrix $R_2$.

The terminal may perform the following procedures to decrease feedback overhead:

Decomposition of a Correlation Matrix:

The correlation matrix $R_1$ and the correlation matrix $R_2$ may have a symmetry. By using the symmetry of each of the correlation matrix $R_1$ and the correlation matrix $R_2$, the terminal may decrease the feedback overhead needed to inform the base station about the correlation matrix $R_1$ and the correlation matrix $R_2$.

The correlation matrix $R_1$ and the correlation matrix $R_2$ may be decomposed into a plurality of sub blocks, for example, four sub blocks as illustrated by the following Equation 4:

$$R_1 = E\{H_1^H H_1\} = \begin{bmatrix} R_{1,11} & R_{1,12} \\ R_{1,21} & R_{1,22} \end{bmatrix} \quad (4)$$

$$R_2 = E\{H_2^H H_2\} = \begin{bmatrix} R_{2,11} & R_{2,12} \\ R_{2,21} & R_{2,22} \end{bmatrix}.$$

Power Normalization of Sub Blocks:

Where each of the correlation matrix $R_1$ and the correlation matrix $R_2$ is decomposed into a plurality of sub blocks, for example, four sub blocks, a power of the four sub blocks may be normalized, as illustrated by the following Equation 5:

$$\tilde{R}_{i,kl} = \chi_{i,kl} R_{i,kl} \quad (5).$$

In this example, $\chi_{i,kl}$ denotes a real scalar as a normalization factor, and is determined to satisfy $\text{Tr}\{|\tilde{R}_{i,kl}|\} = n/2$, where $\text{Tr}\{\}$ denotes a trace function.

Averaging:

Where $\tilde{R}_{i,kl}$ is calculated, the terminal may calculate a sum or an average between sub blocks included in the correlation matrix $R_1$, and sub blocks included in the correlation matrix $R_2$, to decrease the feedback overhead.

For example, the terminal may calculate a plurality of values as illustrated by the following Equation 6. In particular, four $\chi_{i,kl}$ may be unified into $\chi_a$. Six $\tilde{R}_{i,kl} = \chi_{i,kl} R_{i,kl}$ may be unified into $\tilde{R}_{a,11}$, $\tilde{R}_{a,22}$, and $\tilde{R}_{a,12}$. The calculated values may be illustrated by the following Equation 6:

$$\tilde{R}_{a,11} = \frac{1}{2}[\tilde{R}_{1,11} + \tilde{R}_{2,11}] \quad (6)$$

$$\tilde{R}_{a,22} = \frac{1}{2}[\tilde{R}_{1,22} + \tilde{R}_{2,22}]$$

$$\tilde{R}_{a,12} = \frac{1}{2}[\tilde{R}_{1,12} + \tilde{R}_{2,12}]$$

$$\chi_a = \frac{1}{2}\left[\frac{\chi_{1,22}}{\chi_{1,11}} + \frac{\chi_{2,11}}{\chi_{2,22}}\right].$$

The terminal may quantize $\tilde{R}_{a,11}$, $\tilde{R}_{a,22}$, $\tilde{R}_{a,12}$, and $\chi_a$ and shown in the above Equation 6, and may feed back, to the base station, the quantized $\tilde{R}_{a,11}$, $\tilde{R}_{a,22}$, $\tilde{R}_{a,12}$, and $\chi_a$, as information associated with the correlation matrix $R_1$ and the correlation matrix $R_2$.

The base station may reconstruct the correlation matrix $R_1$ and the correlation matrix $R_2$ based on the quantized $\tilde{R}_{a,11}$, $\tilde{R}_{a,22}$, $\tilde{R}_{a,12}$, and $\chi_a$, which is illustrated by the following Equation 7. The terminal may also reconstruct the correlation matrix $R_1$ and the correlation matrix $R_2$ based on $\tilde{R}_{a,11}$, $\tilde{R}_{a,22}$, $\tilde{R}_{a,12}$, and $\chi_a$ that are calculated using the above Equation 6. Equation 7 may follow as:

$$R_1 = \begin{bmatrix} \tilde{R}_{a,11} & \sqrt{\chi_a}\,\tilde{R}_{a,12} \\ \sqrt{\chi_a}\,\tilde{R}_{a,12}^H & \chi_a \tilde{R}_{a,22} \end{bmatrix} \quad (7)$$

$$R_2 = \begin{bmatrix} \chi_a \tilde{R}_{a,11} & \sqrt{\chi_a}\,\tilde{R}_{a,12} \\ \sqrt{\chi_a}\,\tilde{R}_{a,12}^H & \tilde{R}_{a,22} \end{bmatrix}.$$

It can be known from the above Equation 7 that the terminal and the base station may share the correlation matrix $R_1$ and the correlation matrix $R_2$ by sharing $\tilde{R}_{a,11}$, $\tilde{R}_{a,22}$, $\tilde{R}_{a,12}$, and $\chi_a$. Because the base station and the terminal may share the correlation matrix $R_1$ and the correlation matrix $R_2$, the base station and the terminal may obtain the same transformed codebook.

The terminal may perform the following procedures to decrease the feedback overhead.

Decomposition of a Correlation Matrix:

The correlation matrix $R_1$ and the correlation matrix $R_2$ may have a symmetry. By using the symmetry of each of the correlation matrix $R_1$ and the correlation matrix $R_2$, the terminal may decrease the feedback overhead required to inform the base station about the correlation matrix $R_1$ and the correlation matrix $R_2$.

The correlation matrix $R_1$ and the correlation matrix $R_2$ may be decomposed into four sub blocks as illustrated by the following Equation 7-1:

$$R_1 = E\{H_1^H H_1\} \quad (7\text{-}1)$$

$$= \begin{bmatrix} R_{1,11} & R_{1,12} \\ R_{1,21} & R_{1,22} \end{bmatrix}$$

$$R_2 = E\{H_2^H H_2\}$$

$$= \begin{bmatrix} R_{2,11} & R_{2,12} \\ R_{2,21} & R_{2,22} \end{bmatrix}$$

$$R = E\{H^H H\}$$

$$= \begin{bmatrix} R_{11} & R_{12} \\ R_{21} & R_{22} \end{bmatrix}$$

-continued $$= \begin{bmatrix} R_{1,11} & R_{1,12} \\ R_{1,21} & R_{1,22} \end{bmatrix} + \begin{bmatrix} R_{2,11} & R_{2,12} \\ R_{2,21} & R_{2,22} \end{bmatrix}.$$

Power Normalization of Sub Blocks:

Where each of the correlation matrix $R_1$ and the correlation matrix $R_2$ is decomposed into four sub blocks, a power of the four sub blocks may be normalized as illustrated in the following Equation 7-2:

$$\tilde{R}_{i,kl} = \chi_{i,kl} R_{i,kl} \tag{7-2}$$

In this example, $\chi_{i,kl}$ denotes a real scalar as a normalization factor to satisfy $\mathrm{Tr}\{|\tilde{R}_{i,kl}|\}=n_t/2$, where $\mathrm{Tr}\{\ \}$ denotes a trace function.

Power Normalization of a Channel Correlation Matrix:

Where the correlation matrix R is decomposed into four sub blocks, a power of the four sub blocks may be normalized as given by the following Equation 7-3:

$$\tilde{R} = n_t R / \mathrm{Tr}\{R\} = \begin{bmatrix} \tilde{R}_{11} & \tilde{R}_{12} \\ \tilde{R}_{21} & \tilde{R}_{22} \end{bmatrix}, \tag{7-3}$$

where $\mathrm{Tr}\{\ \}$ denotes the trace function.

Averaging:

Where $\chi_{i,kl}$ is calculated, the terminal may unify a plurality of $\chi_{i,kl}$ values into $\chi_a$ to decrease the feedback overhead, and feed back the unified $\chi_a$ to the base station. $\chi_a$ may be illustrated by the following Equation 7-4:

$$\chi_a = \frac{1}{2}\left[\frac{\chi_{1,22}}{\chi_{1,11}} + \frac{\chi_{2,11}}{\chi_{2,22}}\right]. \tag{7-4}$$

The terminal may quantize $\tilde{R}$ and $\chi_a$ disclosed in the above Equation 7-3 and Equation 7-4, respectively, and may feed back the quantized $\tilde{R}$ and $\chi_a$ to the base station as information associated with the correlation matrix $R_1$ and the correlation matrix $R_2$.

The base station may reconstruct the correlation matrix $R_1$ and the correlation matrix $R_2$ based on the quantized $\tilde{R}$ and $\chi_a$, which may be illustrated by the following Equation 7-5. The terminal may also reconstruct the correlation matrix $R_1$ and the correlation matrix $R_2$ based on $\tilde{R}$ and $\chi_a$ that are calculated using the above Equation 6. Equation 7-5 may follow as:

$$R_2 = \begin{bmatrix} \chi_a \tilde{R}_{11} & \sqrt{\chi_a}\, \tilde{R}_{12} \\ \sqrt{\chi_a}\, \tilde{R}_{12}^H & \tilde{R}_{22} \end{bmatrix} \tag{7-5}$$

$$R_2 = \begin{bmatrix} \chi_a \tilde{R}_{11} & \sqrt{\chi_a}\, \tilde{R}_{12} \\ \sqrt{\chi_a}\, \tilde{R}_{12}^H & \tilde{R}_{22} \end{bmatrix}.$$

Accordingly, the base station and the terminal may share the correlation matrix $R_1$ and the correlation matrix $R_2$ by sharing $\tilde{R}$ and $\chi_a$. Because the base station and the terminal may share the correlation matrix $R_1$ and the correlation matrix $R_2$, the base station and the terminal may obtain the same transformed codebook.

Transformation of a Codebook

The base station and the terminal may share the correlation matrix $R_1$ and the correlation matrix $R_2$. The transformed codebook may be obtained as a function of the correlation matrix $R_1$ and the correlation matrix $R_2$.

The transformed codebook may be obtained using various types of schemes. For example, the transformed codebook may vary based on the base codebook C.

In this example, the base codebook C varies according to the correlation matrix $R_1$ and the correlation matrix $R_2$. The base codebook C may be defined in an Institute of Electrical and Electronics Engineers (IEEE) 802.16e standard or an IEEE 802.16m standard. The base codebook C may include N codewords, for example, $v_1$, $v_2$, $v_3$, ... $v_N$. The base station and the terminal may divide the base codebook C into two subsets $C_1$ and $C_2$, each including N/2 codewords. For example, the subsets $C_1$ and $C_2$ may be constructed so that a minimum chordal distance may increase between codewords $V_{C_1,1}, \ldots V_{C_1,N/2}$, included in the subset $C_1$, and a minimum chordal distance may increase between codewords $V_{C_2,1}, \ldots, V_{C_2,N/2}$, included in the subset $C_2$. The transformed codebook may be expressed by the following Equation 8:

$$\left\{\frac{R_1^x v_{C_1,1}}{\|R_1^x v_{C_1,1}\|}, \ldots, \frac{R_1^x v_{C_1,N/2}}{\|R_1^x v_{C_1,N/2}\|}, \frac{R_2^x v_{C_2,1}}{\|R_2^x v_{C_2,1}\|}, \ldots, \frac{R_2^x v_{C_2,N/2}}{\|R_2^x v_{C_2,N/2}\|}\right\}, \tag{8}$$

$$x = 1, \frac{1}{2}, \ldots\ .$$

In this example, a calculation complexity at the base station or the terminal may be adjusted according to x.

Where the transmit antennas are single-polarized, $R_1 \approx R_2 = R$. The above Equation 8 may be expressed by the following Equation 9:

$$\left\{\frac{R_1^x v_{C_1,1}}{\|R_1^x v_{C_1,1}\|}, \ldots, \frac{R_1^x v_{C_1,N/2}}{\|R_1^x v_{C_1,N/2}\|}, \frac{R_2^x v_{C_2,1}}{\|R_2^x v_{C_2,1}\|}, \ldots, \frac{R_2^x v_{C_2,N/2}}{\|R_2^x v_{C_2,N/2}\|}\right\} = \tag{9}$$

$$\left\{\frac{R^{1/2} v_1}{\|R^{1/2} v_1\|}, \ldots, \frac{R^{1/2} v_N}{\|R^{1/2} v_N\|}\right\},$$

$$x = 1, \frac{1}{2}, \ldots\ .$$

A second scheme to obtain the transformed codebook may initially design the base codebook C and then be applied to the base codebook C to transform the codebook. For example, the subset $C_1$ including the codewords $V_{C_1,1}, \ldots, V_{C_1,N/2}$, and the subset $C_2$ including the codewords $V_{C_2,1}, \ldots, V_{C_2,N/2}$ may be initially designed and then the base codebook C including the codewords $\{v_1, v_2, v_3, \ldots v_N\} = \{V_{C_1,1}, \ldots, V_{C_1,N/2}, V_{C_2,1}, \ldots, V_{C_2,N/2}\}$ may be designed. In this example, the base station and the terminal may design the base codebook C, the subset $C_1$, and the subset $C_2$, so that the minimum chordal distance between codewords belonging to each of the base codebook C, the subset $C_1$, and the subset $C_2$ is sufficiently large. The base station and the terminal may obtain the transformed codebook based on the base codebook C, which may be illustrated by the following Equation 10:

$$\left\{\frac{R_1^x v_{C_1,1}}{\|R_1^x v_{C_1,1}\|}, \ldots, \frac{R_1^x v_{C_1,N/2}}{\|R_1^x v_{C_1,N/2}\|}, \frac{R_2^x v_{C_2,1}}{\|R_2^x v_{C_2,1}\|}, \ldots, \frac{R_2^x v_{C_2,N/2}}{\|R_2^x v_{C_2,N/2}\|}\right\} \quad (10)$$

$$x = 1, \frac{1}{2}, \ldots .$$

Where the transmit antennas are single-polarized, $R_1 \approx R_2 = R$. The above Equation 10 may be expressed by the following Equation 11:

$$\left\{\frac{R_1^x v_{C_1,1}}{\|R_1^x v_{C_1,1}\|}, \ldots, \frac{R_1^x v_{C_1,N/2}}{\|R_1^x v_{C_1,N/2}\|}, \frac{R_2^x v_{C_2,1}}{\|R_2^x v_{C_2,1}\|}, \ldots, \frac{R_2^x v_{C_2,N/2}}{\|R_2^x v_{C_2,N/2}\|}\right\} = \quad (11)$$

$$\left\{\frac{R^{1/2} v_1}{\|R^{1/2} v_1\|}, \ldots, \frac{R^{1/2} v_N}{\|R^{1/2} v_N\|}\right\},$$

$$x = 1, \frac{1}{2}, \ldots .$$

The following Equation 12 through Equation 14 illustrate how each transformed codebook may be different to each other with respect to various types of schemes of calculating the channel correlation matrix.

Where the correlation matrix is calculated using $R_1 = E\{h_1^H h_1\} = \text{diag}\{1,1,\chi,\chi\}$, the transformed codebook may be expressed by the following Equation 12:

$$\left\{\frac{R_1^x v_1}{\|R_1^x v_1\|}, \ldots, \frac{R_1^x v_N}{\|R_1^x v_N\|}\right\} = \quad (12)$$

$$\left\{\frac{\text{diag}\{1, 1, \sqrt{\chi}, \sqrt{\chi}\} v_1}{\|\text{diag}\{1, 1, \sqrt{\chi}, \sqrt{\chi}\} v_1\|}, \ldots, \frac{\text{diag}\{1, 1, \sqrt{\chi}, \sqrt{\chi}\} v_N}{\|\text{diag}\{1, 1, \sqrt{\chi}, \sqrt{\chi}\} v_N\|}\right\}.$$

$$x = 1, \frac{1}{2},$$

Where the correlation matrix is calculated using $R_2 = E\{h_2^H h_2\} = \text{diag}\{\chi,\chi,1,1\}$, the transformed codebook may be expressed by the following Equation 13:

$$\left\{\frac{R_2^x v_1}{\|R_2^x v_1\|}, \ldots, \frac{R_2^x v_N}{\|R_2^x v_N\|}\right\} = \left\{\frac{\text{diag}\{\sqrt{\chi}, \sqrt{\chi}, 1, 1\} v_1}{\|\text{diag}\{\sqrt{\chi}, \sqrt{\chi}, 1, 1\} v_1\|}, \ldots, \frac{\text{diag}\{\sqrt{\chi}, \sqrt{\chi}, 1, 1\} v_N}{\|\text{diag}\{\sqrt{\chi}, \sqrt{\chi}, 1, 1\} v_N\|}\right\}. \quad (13)$$

$$x = 1, \frac{1}{2}, \ldots .$$

Where the channel correlation matrix is calculated using $R=E\{H^H H\}=(1+\chi)I$, the transformed codebook may be expressed by the following Equation 14:

$$\left\{\frac{R^x v_1}{\|R^x v_1\|}, \ldots, \frac{R^x v_N}{\|R^x v_N\|}\right\} = \{v_1, \ldots, v_N\}, \quad (14)$$

$$x = 1, \frac{1}{2}, \ldots .$$

Generally, a principle where the base station and the terminal may generate the transformed codebook may be expressed by the following Equation 15:

$$\left\{\frac{R_1^{1/2} v_{C_1,1}}{\|R_1^{1/2} v_{C_1,1}\|}, \ldots, \frac{R_1^{1/2} v_{C_1,N/2}}{\|R_1^{1/2} v_{C_1,N/2}\|}, \frac{R_2^{1/2} v_{C_1,1}}{\|R_2^{1/2} v_{C_1,1}\|}, \ldots, \frac{R_2^{1/2} v_{C_1,N/2}}{\|R_2^{1/2} v_{C_1,N/2}\|}\right\} = \left\{\frac{\mathrm{diag}\{1,1,\sqrt{\chi},\sqrt{\chi}\} v_{C_1,1}}{\|\mathrm{diag}\{1,1,\sqrt{\chi},\sqrt{\chi}\} v_{C_1,1}\|}, \ldots, \frac{\mathrm{diag}\{1,1,\sqrt{\chi},\sqrt{\chi}\} v_{C_1,N/2}}{\|\mathrm{diag}\{1,1,\sqrt{\chi},\sqrt{\chi}\} v_{C_1,N/2}\|}, \frac{\mathrm{diag}\{\sqrt{\chi},\sqrt{\chi},1,1\} v_{C_1,1}}{\|\mathrm{diag}\{\sqrt{\chi},\sqrt{\chi},1,1\} v_{C_1,1}\|}, \ldots, \frac{\mathrm{diag}\{\sqrt{\chi},\sqrt{\chi},1,1\} v_{C_1,N/2}}{\|\mathrm{diag}\{\sqrt{\chi},\sqrt{\chi},1,1\} v_{C_1,N/2}\|}\right\}. \quad (15)$$

Another Scheme to Transform a Codebook in Greater than or Equal to Rank 2

In a rank greater than or equal to rank 2, a codebook may be transformed using other schemes in addition to the aforementioned schemes.

For example, in the case of rank 2, a base codebook C of rank 2 may include N codewords. A codeword Ck denotes an Nt×2 matrix and includes 2 vectors. The codeword Ck may be expressed by the following Equation 16:

$$C_k = [c_{k,1} c_{k,2}] \text{ for } k = 1 \ldots N \quad (16).$$

The transformed codebook $\hat{C}_k$ may be obtained according to the following Equation 17:

$$\hat{C}_k = \mathrm{orth}([R_1^x c_{k,1} R_2^x c_{k,2}]), x = 1, \tfrac{1}{2}, \quad (17).$$

Here, orth(A) denotes a result that is obtained by performing an orthogonality with respect to a matrix A.

Accordingly, the transformed codebook may be expressed by the following Equation 18:

$$\{\hat{C}_k\}_{k=1,\ldots,N} = \{\mathrm{orth}([R_1^x c_{k,1} R_2^x c_{k,2}])\}_{k=1,\ldots,N}, x=1,\tfrac{1}{2}, \quad (18)$$

Generally, where codewords included in a first codebook include at least two vectors, the first codebook may be transformed to a second codebook by making at least two correlation matrices that correspond to the at least two vectors, respectively. For example, where $T(R, c_k)$ is defined as a transformed vector $c_k$ based on a correlation matrix R, a transformed rank 2 codebook may be expressed by the following Equation 19:

$$\{\hat{C}_k\}_{k=1,\ldots,N} = \{\mathrm{orth}([T(R_1,c_{k,1}) T(R_2,c_{k,2})])\}_{k=1,\ldots,N} \quad (19).$$

A codeword $C_k$ with respect to a random rank r may include r columns.

In this example, the transformed rank 2 codebook may be expressed by the following Equation 20:

$$\{\hat{C}_k\}_{k=1,\ldots,N} = \{\mathrm{orth}([R_{a_1}^x c_{k,1} R_{a_2}^x c_{k,2} \ldots R_{a_r}^x c_{k,r}])\}_{k=1,\ldots,N}, x=1,\tfrac{1}{2},\ldots$$

$$a_1, a_2, \ldots, a_r = 1 \text{ or } 2$$

$$\{\hat{C}_k\}_{k=1,\ldots,N} = \{\mathrm{orth}([T(R_{a_1},c_{k,1}) T(R_{a_2},c_{k,2}) \ldots T(R_{a_r},c_{k,r})])\}_{k=1,\ldots,N},$$

$$a_1, a_2, \ldots, a_r = 1 \text{ or } 2 \quad (20).$$

As described above, where the transformed codebook is generated by the base station and the terminal, the terminal may select a preferred vector or a preferred matrix based on the transformed codebook, and may feed back, to the base station, information associated with the preferred vector or the preferred matrix. For example, information associated with the preferred vector or the preferred matrix may include information associated with an index of the preferred vector or the preferred matrix among codewords included in the transformed codebook.

Where information associated with the preferred vector or the preferred matrix is fed back from the terminal to the base station, the base station may determine a precoding matrix. The base station may precode at least one data stream using the precoding matrix.

Examples of a Base Codebook to Generate a Transformed Codebook

The transformed codebook may vary according to the base codebook C, or the subset $C_1$ and the subset $C_2$. Hereinafter, specific examples of the base codebook C, or the subset $C_1$ and the subset $C_2$ used to generate the transformed codebook will be described.

The base codebook C, or the subset $C_1$ and the subset $C_2$ may be obtained from a 3-bit rank 1 codebook with respect to two transmit antennas, defined in an IEEE 802.16e standard, and may be expressed by the following Equation 21:

| (21). | | | |
|---|---|---|---|
| $C_1=$ Index | | | |
| 1 | 2 | 6 | 7 |
| 1.0000 0 | 0.7940 −0.5801 + 0.1818i | 0.3289 0.6614 + 0.6740i | 0.5112 0.4754 − 0.7160i |
| $C_2=$ Index | | | |
| 3 | 4 | 5 | 8 |
| 0.7940 0.0576 + 0.6051i | 0.7941 −0.2978 − 0.5298i | 0.7941 0.6038 + 0.0689i | 0.3289 −0.8779 − 0.3481i |

In this example, the index denotes a codeword included in the base codebook C. For example, a codeword of an index 6 indicates $V_{C1,6}$, and a codeword of an index 8 indicates $V_{C2,8}$.

The base codebook C, or the subset $C_1$ and the subset $C_2$ may be obtained from a 3-bit rank 1 codebook with respect to four transmit antennas, defined in the IEEE 802.16e standard, and may be expressed by the following Equation 22:

| (22). | | | |
|---|---|---|---|
| $C_1=$ Index | | | |
| 1 | 4 | 5 | 6 |
| 1.0000 0 0 0 | 0.3780 0.2830 − 0.0940i 0.0702 − 0.8261i −0.2801 + 0.0491i | 0.3780 −0.0841 + 0.6478i 0.0184 + 0.0490i −0.3272 − 0.5662i | 0.3780 0.5247 + 0.3532i 0.4115 + 0.1825i 0.2639 + 0.4299i |
| $C_2=$ Index | | | |
| 2 | 3 | 7 | 8 |
| 0.3780 −0.2698 − 0.5668i 0.5957 + 0.1578i 0.1587 − 0.2411i | 0.3780 −0.7103 + 0.1326i −0.2350 − 0.1467i 0.1371 + 0.4893i | 0.3780 0.2058 − 0.1369i −0.5211 + 0.0833i 0.6136 − 0.3755i | 0.3780 0.0618 − 0.3332i −0.3456 + 0.5029i −0.5704 + 0.2113i |

The base codebook C, or the subset $C_1$ and the subset $C_2$ may be obtained from a 6-bit rank 1 codebook with respect to four transmit antennas, defined in the IEEE 802.16e standard, and may be expressed by the following Equation 23:

| (23). | | | |
|---|---|---|---|
| $C_1=$ Columns 1 through 4 Index: | | | |
| 36 | 54 | 20 | 30 |
| 0.5015 − 0.0000i −0.2862 + 0.4416i −0.2457 + 0.2366i −0.4112 + 0.4314i | 0.4382 −0.3935 − 0.4500i 0.0606 + 0.5088i 0.4314 − 0.0443i | 0.6803 − 0.0000i −0.2432 + 0.5431i −0.1269 + 0.2544i −0.2626 − 0.1825i | 0.3227 + 0.0000i −0.1524 + 0.1959i 0.7728 − 0.1445i 0.4423 + 0.1431i |
| Columns 5 through 8 Index: | | | |
| 39 | 52 | 47 | 57 |
| 0.4801 −0.4788 + 0.5464i | 0.8936 − 0.0000i −0.1516 + 0.1154i | 0.5949 0.1558 − 0.2349i | 0.6570 0.1885 − 0.2454i |

-continued

|   |   | (23). |   |
|---|---|---|---|
| 0.3126 + 0.2377i | −0.1195 − 0.0935i | 0.6701 − 0.1264i | −0.4445 + 0.1772i |
| −0.2036 + 0.2147i | 0.0609 − 0.3721i | −0.0562 − 0.3139i | 0.2727 + 0.4115i |

Columns 9 through 12
Index:

| 16 | 22 | 11 | 1 |
|---|---|---|---|
| 0.6264 | 0.2019 − 0.0000i | 0.6040 + 0.0000i | 0.5000 |
| 0.1145 − 0.1440i | 0.8742 − 0.1494i | 0.0823 + 0.3279i | 0.0000 + 0.5000i |
| 0.0745 − 0.3216i | −0.1557 + 0.1842i | 0.7147 + 0.0600i | −0.5000 + 0.0000i |
| −0.2058 − 0.6500i | 0.2608 − 0.2157i | −0.0624 + 0.0511i | −0.0000 − 0.5000i |

Columns 13 through 16
Index:

| 29 | 28 | 21 | 46 |
|---|---|---|---|
| 0.7339 + 0.0000i | 0.5254 + 0.0000i | 0.2752 − 0.0000i | 0.3064 − 0.0000i |
| 0.0574 + 0.0819i | 0.3940 − 0.2805i | 0.1655 − 0.3560i | −0.2241 + 0.3578i |
| −0.6296 + 0.0293i | 0.1817 − 0.4617i | −0.0849 + 0.3618i | −0.0062 − 0.6070i |
| 0.2104 − 0.0990i | −0.4845 − 0.0953i | 0.2054 + 0.7680i | 0.5974 + 0.0506i |

Columns 17 through 20
Index:

| 2 | 53 | 12 | 56 |
|---|---|---|---|
| 0.4529 − 0.0000i | 0.4765 − 0.0000i | 0.6378 − 0.0000i | 0.5604 |
| −0.0059 − 0.3220i | 0.6113 + 0.5146i | −0.1356 − 0.2827i | 0.4187 + 0.4254i |
| 0.5830 + 0.3666i | −0.1360 − 0.3050i | −0.2834 − 0.3188i | 0.3390 + 0.0502i |
| 0.4656 + 0.0082i | −0.1513 − 0.0059i | −0.1532 + 0.5381i | −0.4326 − 0.1582i |

Columns 21 through 24
Index:

| 40 | 42 | 26 | 52 |
|---|---|---|---|
| 0.2819 + 0.0000i | 0.1669 | 0.3377 − 0.0000i | 0.2051 + 0.0000i |
| 0.3243 − 0.0827i | −0.5821 + 0.0361i | −0.0557 − 0.2152i | −0.1721 + 0.0352i |
| 0.1090 − 0.2542i | 0.2189 + 0.7604i | −0.5304 + 0.6184i | −0.1656 − 0.1100i |
| −0.7259 + 0.4528i | 0.0603 + 0.0463i | 0.3649 − 0.1992i | −0.9339 − 0.1241i |

Columns 25 through 28
Index:

| 59 | 19 | 63 | 5 |
|---|---|---|---|
| 0.2846 − 0.0000i | 0.3299 + 0.0000i | 0.8254 − 0.0000i | 0.5261 − 0.0000i |
| 0.2029 + 0.0401i | −0.1036 − 0.5704i | −0.1916 − 0.0197i | 0.4578 + 0.1394i |
| 0.7669 − 0.0053i | 0.3322 − 0.0914i | 0.4524 − 0.1277i | −0.1299 + 0.4665i |
| −0.5189 − 0.1376i | −0.2763 − 0.6000i | 0.2452 − 0.0239i | 0.1388 + 0.4904i |

Columns 29 through 32
Index:

| 27 | 9 | 17 | 3 |
|---|---|---|---|
| 0.6259 + 0.0000i | 0.3210 − 0.0000i | 0.4733 − 0.0000i | 0.4175 − 0.0000i |
| −0.1124 + 0.3086i | 0.2484 − 0.6006i | −0.0350 + 0.4319i | −0.8206 − 0.0812i |
| 0.4073 − 0.2116i | −0.4694 − 0.0851i | −0.6206 + 0.4210i | −0.0466 − 0.1324i |
| 0.1762 + 0.5087i | −0.2080 + 0.4514i | −0.1480 + 0.0627i | −0.3040 + 0.1833i |

$C_2 =$
Columns 1 through 4
Index:

| 4 | 6 | 7 | 8 |
|---|---|---|---|
| 0.5034 − 0.0000i | 0.1673 − 0.0000i | 0.2104 | 0.7564 − 0.0000i |
| −0.1137 + 0.3083i | −0.8917 − 0.2667i | −0.1630 − 0.1634i | 0.2752 + 0.4443i |

-continued

|  | (23). |  |  |
|---|---|---|---|
| 0.0057 + 0.0633i | 0.1501 + 0.2390i | 0.2089 + 0.3931i | 0.1752 + 0.1138i |
| −0.3257 − 0.7270i | 0.1110 + 0.1177i | 0.1898 − 0.8175i | −0.0804 + 0.3233i |

Columns 5 through 8
Index:

| 10 | 13 | 14 | 15 |
|---|---|---|---|
| 0.3436 + 0.0000i | 0.6384 + 0.0000i | 0.1963 − 0.0000i | 0.6758 + 0.0000i |
| 0.4401 + 0.0659i | 0.3738 + 0.1332i | 0.0907 + 0.0726i | −0.5192 − 0.0785i |
| −0.5671 − 0.0323i | −0.3179 − 0.3015i | 0.5718 + 0.7828i | 0.1093 − 0.3312i |
| 0.5583 − 0.2228i | 0.1650 − 0.4645i | 0.0911 + 0.0031i | 0.1449 + 0.3534i |

Columns 9 through 12
Index:

| 18 | 23 | 24 | 25 |
|---|---|---|---|
| 0.4043 + 0.0000i | 0.4851 − 0.0000i | 0.5810 + 0.0000i | 0.4697 + 0.0000i |
| −0.5936 − 0.1742i | −0.4030 + 0.2770i | 0.1118 + 0.1280i | 0.8119 + 0.0535i |
| 0.4292 − 0.0665i | 0.3314 + 0.4502i | −0.0460 − 0.0235i | −0.0709 − 0.2273i |
| 0.5012 + 0.1185i | −0.1667 − 0.4303i | −0.0396 + 0.7933i | −0.1535 − 0.1924i |

Columns 13 through 16
Index:

| 31 | 33 | 34 | 35 |
|---|---|---|---|
| 0.3597 + 0.0000i | 0.1759 + 0.0000i | 0.1191 + 0.0000i | 0.6621 + 0.0000i |
| −0.2780 − 0.4907i | −0.0345 + 0.1074i | −0.8248 + 0.1153i | −0.2524 − 0.2046i |
| 0.2756 − 0.5382i | −0.5177 + 0.5301i | −0.0024 − 0.4536i | 0.3214 + 0.1314i |
| −0.3834 + 0.1998i | −0.3808 + 0.5121i | 0.2507 + 0.1533i | 0.1376 − 0.5626i |

Columns 17 through 20
Index:

| 37 | 38 | 41 | 43 |
|---|---|---|---|
| 0.1614 − 0.0000i | 0.4525 + 0.0000i | 0.7411 + 0.0000i | 0.3285 − 0.0000i |
| 0.5947 + 0.4581i | 0.3386 − 0.4038i | 0.5741 + 0.0764i | −0.1896 + 0.0197i |
| −0.1229 − 0.0033i | −0.0663 + 0.4865i | −0.2356 + 0.0499i | 0.1262 − 0.5180i |
| −0.5490 − 0.3063i | 0.4931 − 0.1826i | 0.2345 + 0.0474i | 0.0010 + 0.7559i |

Columns 21 through 24
Index:

| 44 | 45 | 48 | 49 |
|---|---|---|---|
| 0.8612 | 0.4722 | 0.7806 | 0.2386 + 0.0000i |
| 0.3610 + 0.0871i | −0.1616 − 0.2107i | −0.4453 + 0.0626i | 0.0441 + 0.2702i |
| 0.2273 − 0.2023i | −0.7948 + 0.1071i | −0.4039 − 0.0513i | −0.1984 − 0.4442i |
| −0.0091 − 0.1666i | −0.1053 + 0.2289i | −0.1043 + 0.1089i | 0.0128 − 0.7945i |

Columns 25 through 28
Index:

| 50 | 51 | 55 | 58 |
|---|---|---|---|
| 0.2363 | 0.7098 | 0.1984 − 0.0000i | 0.1785 + 0.0000i |
| 0.5887 − 0.2611i | −0.6699 + 0.0265i | −0.3459 + 0.4714i | 0.4083 + 0.5675i |
| 0.3818 + 0.5879i | 0.1180 + 0.0872i | 0.1675 − 0.1088i | 0.1165 − 0.5211i |
| 0.1613 − 0.1097i | 0.0780 − 0.1381i | −0.2862 + 0.7050i | 0.4406 − 0.0086i |

Columns 29 through 32
Index:

| 60 | 61 | 62 | 64 |
|---|---|---|---|
| 0.9340 | 0.3029 + 0.0000i | 0.1683 − 0.0000i | 0.4508 − 0.0000i |
| 0.0187 + 0.0450i | 0.3968 − 0.2460i | −0.0101 + 0.3606i | −0.3115 − 0.3205i |
| −0.0862 − 0.1445i | −0.3833 − 0.5394i | −0.8263 + 0.0850i | −0.3590 − 0.3505i |
| 0.1595 + 0.2674i | −0.3261 − 0.3822i | 0.3460 − 0.1786i | −0.5872 + 0.0231i |

The base codebook C, or the subset $C_1$ and the subset $C_2$ may be obtained from a 3-bit rank 1 codebook with respect to two transmit antennas, defined in an IEEE 802.16m standard, and may be expressed by the following Equation 24:

$$(24)$$

| $C_1=$ Index: | | | |
|---|---|---|---|
| 1 | 2 | 5 | 6 |
| 0.7071 | 0.7071 | 0.7071 | 0.7071 |
| 0.7071 | −0.7071 | 0.5000 + 0.5000i | −0.5000 − 0.5000i |

| $C_2=$ Index: | | | |
|---|---|---|---|
| 3 | 4 | 7 | 8 |
| 0.7071 | 0.7071 | 0.7071 | 0.7071 |
| 0 + 0.7071i | 0 − 0.7071i | −0.5000 + 0.5000i | 0.5000 − 0.5000i |

The base codebook C, or the subset $C_1$ and the subset $C_2$ may be obtained from a 4-bit rank 1 codebook with respect to four transmit antennas, defined in the IEEE 802.16m standard, and may be expressed by the following Equation 25:

$$(25)$$

$C_1=$
Columns 1 through 4
Index:

| 1 | 2 | 3 | 4 |
|---|---|---|---|
| 0.5000 | 0.5000 | −0.5000 | −0.5000 |
| 0.5000 | −0.5000 | −0.5000 | 0.5000 |
| 0.5000 | 0.5000 | 0.5000 | 0.5000 |
| 0.5000 | −0.5000 | 0.5000 | −0.5000 |

Columns 5 through 8
Index:

| 5 | 6 | 7 | 8 |
|---|---|---|---|
| 0.5000 | 0.5000 | −0.5000 | −0.5000 |
| 0 + 0.5000i | 0 − 0.5000i | 0 − 0.5000i | 0 + 0.5000i |
| 0.5000 | 0.5000 | 0.5000 | 0.5000 |
| 0 + 0.5000i | 0 − 0.5000i | 0 + 0.5000i | 0 − 0.5000i |

$C_2=$
Columns 1 through 4
Index:

| 9 | 10 | 11 | 12 |
|---|---|---|---|
| 0.5000 | 0.5000 | 0.5000 | 0.5000 |
| 0.5000 | 0 + 0.5000i | −0.5000 | 0 − 0.5000i |
| 0.5000 | −0.5000 | 0.5000 | −0.5000 |
| −0.5000 | 0 + 0.5000i | 0.5000 | 0 − 0.5000i |

Columns 5 through 8
Index:

| 13 | 14 | 15 | 16 |
|---|---|---|---|
| 0.5000 | 0.5000 | 0.5000 | 0.5000 |
| 0.3536 + 0.3536i | −0.3536 + 0.3536i | −0.3536 − 0.3536i | 0.3536 − 0.3536i |
| 0 + 0.5000i | 0 − 0.5000i | 0 + 0.5000i | 0 − 0.5000i |
| −0.3536 + 0.3536i | 0.3536 + 0.3536i | 0.3536 − 0.3536i | −0.3536 − 0.3536i |

Figure 3:
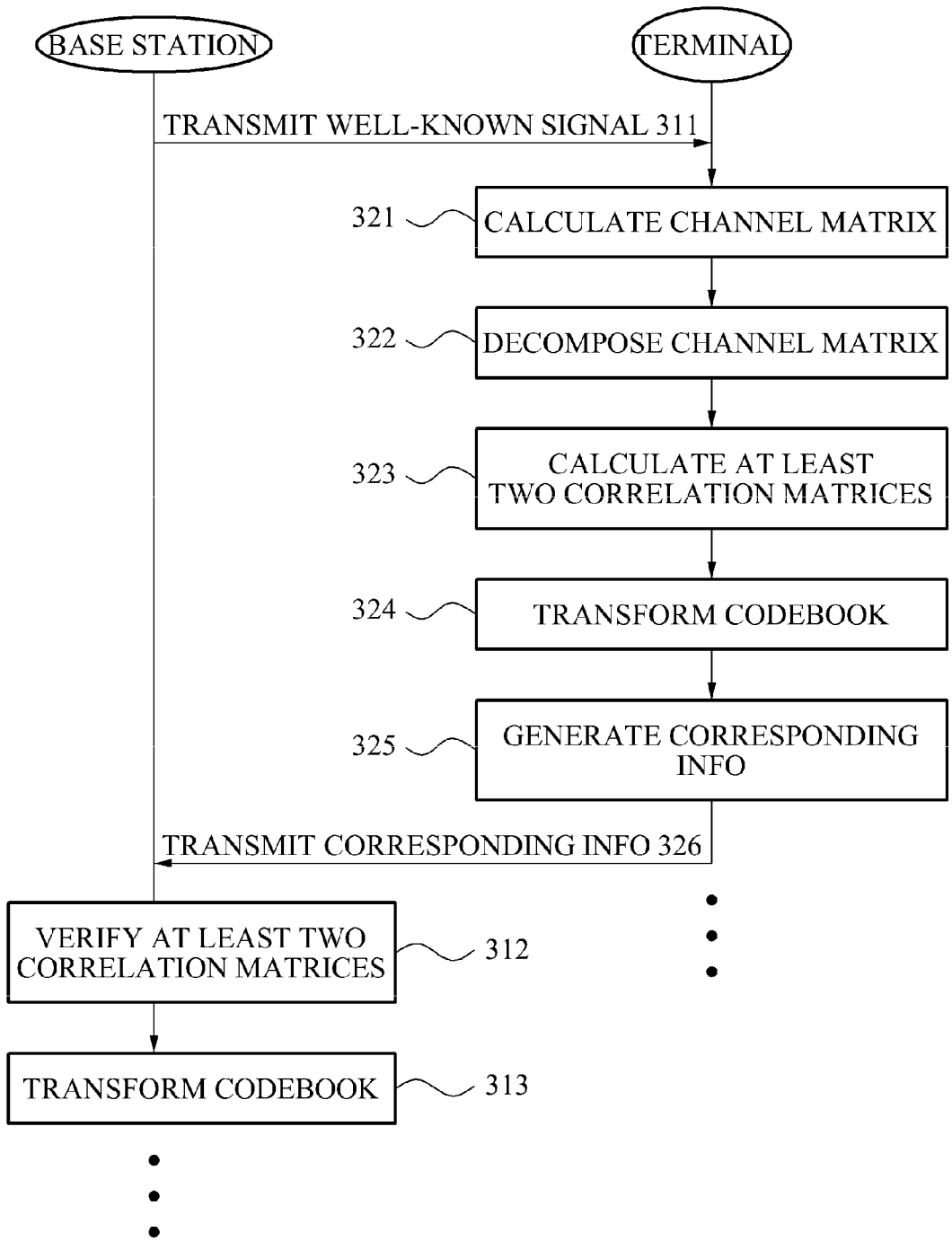
FIG. 3 is a flowchart illustrating an exemplary method of transforming a codebook by a base station and a terminal.

FIG. 3 illustrates an exemplary method of transforming a codebook by a base station and a terminal.

In 311, the base station transmits a well-known signal to the terminal. In 321, the terminal calculates a channel matrix between the terminal and the base station.

In 322, the terminal decomposes the channel matrix into at least two subchannel matrices. In 323, the terminal calculates at least two correlation matrices corresponding to the at least two subchannel matrices.

According to an exemplary embodiment, operation 322 may include decomposing the channel matrix into the at least two subchannel matrices based on at least one polarization of transmit antennas installed in the base station, or at least one polarization of at least one receive antenna installed in the terminal. In some embodiments, 322 may be omitted, and in 323 the terminal may calculate a correlation matrix that corresponds to the channel matrix.

Although not shown in FIG. 3, the terminal may normalize a power of sub blocks included in each of the at least two correlation matrices, using normalization factors, and generate information associated with the normalization factors.

In 324, the terminal transforms a codebook using the at least two correlation matrices.

In 325, the terminal generates information for the transmitter to reconstruct the at least two correlation matrices so that the base station may also transform the codebook.

Information for the transmitter to reconstruct the at least two correlation matrices may include information associated with $\tilde{R}_{a,11}$, $\tilde{R}_{a,22}$, $\tilde{R}_{a,12}$, and $\chi_a$, which is described above with reference to the above Equation 7.

In 326, the terminal feeds back information associated with $\tilde{R}_{a,11}$, $\tilde{R}_{a,22}$, $\tilde{R}_{a,12}$, and $\chi_a$ to the base station as information associated with the least two correlation matrices.

In 312, the base station reconstructs or verifies the at least two correlation matrices based on information associated with $\tilde{R}_{a,11}$, $\tilde{R}_{a,22}$, $\tilde{R}_{a,12}$, and $\chi_a$. In 313, the base station transforms the codebook based on the reconstructed or verified at least two correlation matrices. Using the above information the base station can transform the codebook of the base station such that the codebook transformed by the base station is the same as the adapted codebook transformed by the terminal.

In the above described exemplary method, the terminal decomposes the channel matrix into at least two subchannel matrices and the terminal calculates at least two correlation matrices corresponding to the at least two subchannel matrices. In some embodiments, the terminal can calculate a correlation matrix that corresponds to the subchannel matrix. The terminal may then feed back information associated with the correlation matrix for the base station to reconstruct. A codebook stored in the memory of the terminal can be adaptively transformed by the terminal, based upon the correlation matrix, and a codebook stored in the memory of the base station can be transformed based upon the correlation matrix.

Figure 4:
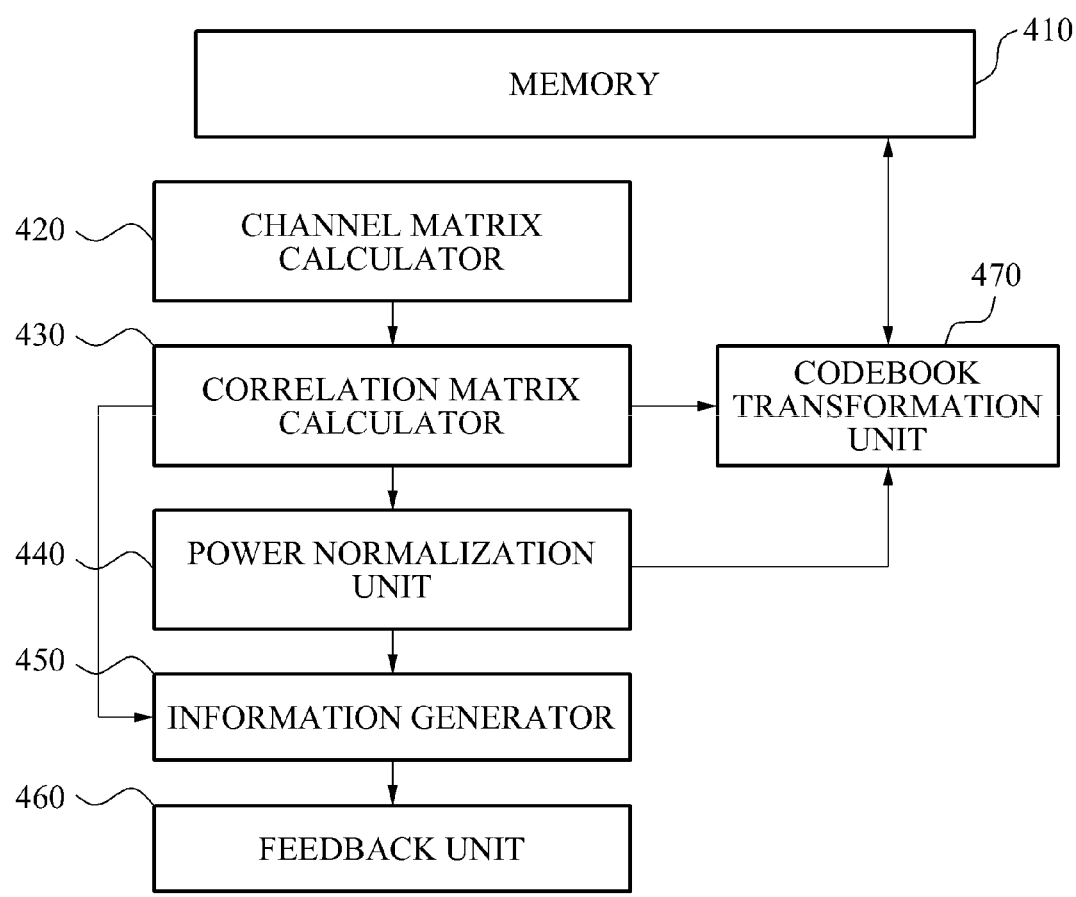
FIG. 4 is a block diagram illustrating an exemplary terminal.

FIG. 4 illustrates an exemplary terminal 400.

The terminal 400 includes a memory 410, a channel matrix calculator 420, a correlation matrix calculator 430, a power normalization unit 440, an information generator 450, a feedback unit 460, and a codebook transformation unit 470.

A codebook to be transformed may be stored in the memory 410. For example, a base codebook defined in an IEEE 802.16e standard, an IEEE 802.16m standard, and the like may be stored in the memory 410.

The channel matrix calculator 420 may calculate a channel matrix between the terminal 410 and a base station (not shown). The channel matrix calculator 420 may decompose the channel matrix into one or more subchannels, for example, one subchannel matrix, two subchannel matrices, three subchannel matrices, or more. In this example, the channel matrix is decomposed into at least two subchannel matrices.

The correlation matrix calculator 430 may calculate at least two correlation matrices corresponding to at least two subchannel matrices. The power normalization unit 440 may normalize a power of sub blocks included in each of the at least two correlation matrices, using normalization factors.

The information generator 450 may generate information for the transmitter to reconstruct the at least two correlation matrices that are associated with the plurality of sub blocks included in each of the at least two correlation matrices. For example, information for the transmitter to reconstruct the at least two correlation matrices may include information associated with a sum or an average between a plurality of sub blocks included in a particular matrix, and another plurality of sub blocks included in at least one other correlation matrix. Information for the transmitter to reconstruct the at least two correlation matrices may include information associated with the normalization factors. For example, information associated with the normalization factors may be information associated with at least one value used to unify the normalization factors.

The feedback unit 460 may feed back, to the base station, information for the transmitter to reconstruct the at least two correlation matrices.

The codebook transformation unit 470 may transform a codebook that is stored in the memory 410. For example, where a first codebook is stored in the memory 410, the codebook transformation unit 470 may transform the first codebook to a second codebook. Also, the base station may verify at least two correlation matrices based on information for the transmitter to reconstruct the at least two correlation matrices. The base station may transform a first codebook stored in the memory of the base station, to a second codebook that is the same as the second codebook of the terminal.

Figure 5:
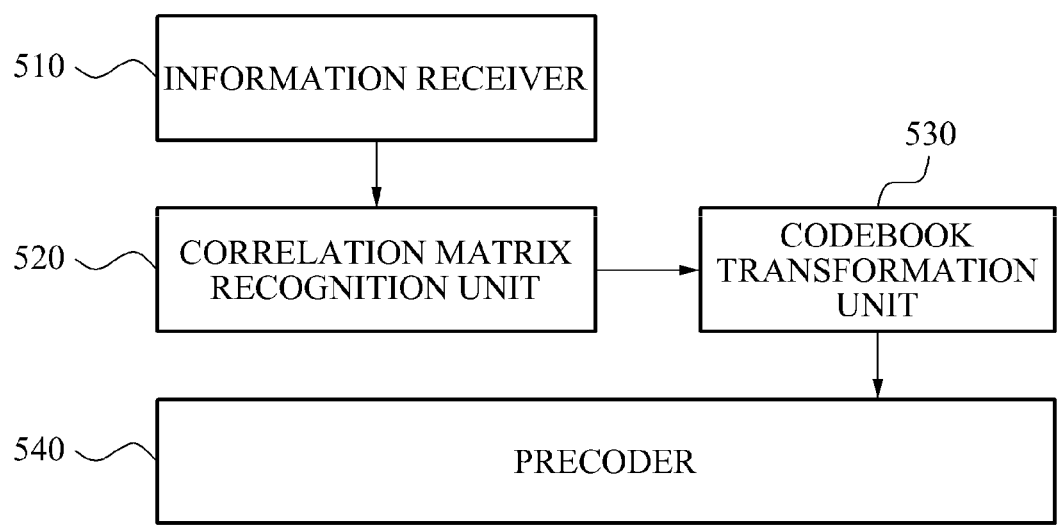
FIG. 5 is a block diagram illustrating an exemplary base station.

FIG. 5 illustrates an exemplary base station 500.

The base station 500 includes an information receiver 510, a correlation matrix recognition unit 520, a codebook transformation unit 530, and a precoder 540.

The information receiver 510 may receive information associated with one or more correlation matrices corresponding to one or more subchannel matrices that are included in a channel matrix between a terminal (not shown) and the base station 500. In this example the information receiver 510 receives information associated with at least two subchannel matrices. As described above, information for the transmitter to reconstruct the at least two correlation matrices may include information associated with $\tilde{R}_{a,11}$, $\tilde{R}_{a,22}$, $\tilde{R}_{a,12}$, and $\chi_a$.

The correlation matrix recognition unit 520 may recognize the at least two correlation matrices based on the received information that the transmitter may use to reconstruct the at least two correlation matrices.

The codebook transformation unit 530 may transform a pre-stored codebook, for example, a first codebook or a base codebook.

The precoder 540 may generate a precoding matrix based on the transformed codebook, and precode at least one data stream using the precoding matrix.

The methods described above including a terminal and base station communication method may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage or recording medium may be distributed among computer systems connected through a network and computer-readable instructions or codes may be stored and executed in a decentralized manner.

As described herein, a number of exemplary embodiments may be applied in the downlink and the uplink. For example, in the downlink, the base station may be a 'transmitter' and the terminal may be a 'receiver'. On the other hand, in the uplink, the base station may be a 'receiver', and the terminal may be a 'transmitter'.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a receiver, comprising:
    calculating a channel matrix between the receiver and a transmitter;
    calculating one or more correlation matrices corresponding to the channel matrix between the receiver and the transmitter;
    feeding back information for the transmitter to reconstruct the one or more correlation matrices;
    transforming a first codebook to a second codebook using the one or more correlation matrices;
    selecting a preferred vector or a preferred matrix using the second codebook; and
    feeding back, to the transmitter, information associated with the preferred vector or the preferred matrix, wherein
    calculating the channel matrix comprises:
        decomposing the channel matrix into at least two subchannel matrices, and
        calculating at least two correlation matrices that correspond to the at least two subchannel matrices.

2. The method of claim 1, wherein the decomposing comprises decomposing the channel matrix into the at least two subchannel matrices is based on at least one of the polarization of one or more transmit antennas installed in the transmitter, and the polarization of one or more receive antennas installed in the receiver.

3. The method of claim 1, further comprising:
    decomposing each of the one or more correlation matrices into a plurality of sub blocks;
    normalizing a power of the sub blocks included in each of the one or more correlation matrices using normalization factors; and
    feeding back to the transmitter information associated with the normalization factors.

4. The method of claim 3, further comprising:
    unifying the normalization factors into at least one value to generate information associated with the normalization factors.

5. The method of claim 1, further comprising:
    generating information for the transmitter to reconstruct the at least two correlation matrices that are associated with a plurality of sub blocks included in each of the at least two correlation matrices.

6. The method of claim 5, wherein the generating comprises calculating a sum or an average between a plurality of sub blocks included in a particular correlation matrix, and another plurality of sub blocks included in at least one other correlation matrix, to generate information for the transmitter to reconstruct the at least two correlation matrices.

7. The method of claim 5, wherein the generating comprises generating information for the transmitter to reconstruct the at least two correlation matrices using a symmetry of each of the at least two correlation matrices.

8. The method of claim 1, wherein the feeding back comprises feeding back information for the transmitter to reconstruct the one or more correlation matrices so that the transmitter transforms a first codebook to a second codebook.

9. The method of claim 1, wherein the feeding back of the information for the transmitter operation includes transmitting the information, to the receiver, for the transmitter to reconstruct the one or more correlation matrices.

10. A communication method of a transmitter, comprising:
    receiving information for the transmitter to reconstruct one or more correlation matrices corresponding to a channel matrix between a receiver and the transmitter;
    recognizing the one or more correlation matrices using the information received for the transmitter to reconstruct the one or more correlation matrices;
    transforming a first codebook to a second codebook using the one or more correlation matrices; and
    generating a precoding matrix using a preferred vector or a preferred matrix of the receiver,
    wherein the preferred vector or the preferred matrix is selected among from the second codebook.

11. The method of claim 10, wherein the receiving comprises receiving information for the transmitter to reconstruct at least two correlation matrices corresponding to at least two subchannel matrices included in a channel matrix, and the recognizing comprises recognizing the at least two correlation matrices.

12. The method of claim 11, wherein the recognizing comprises recognizing the at least two correlation matrices using a symmetry of each of the at least two correlation matrices.

13. The method of claim 11, wherein the information for the transmitter to reconstruct the at least two correlation matrices is associated with a sum or an average between a plurality of sub blocks, included in a particular correlation matrix, and another plurality of sub blocks, included in at least one other correlation matrix.

14. The method of claim 10, further comprising:
receiving information associated with normalization factors that are used to normalize a plurality of sub blocks included in each of the one or more correlation matrices.

15. The method of claim 14, wherein information associated with the normalization factors is associated with at least one value used to unify the normalization factors.

16. A non-transitory computer-readable recording medium storing a program to implement a method comprising:
calculating a channel matrix between a receiver and a transmitter;
calculating one or more correlation matrices corresponding to the channel matrix between the receiver and the transmitter;
feeding back information for the transmitter to reconstruct the one or more correlation matrices;
transforming a first codebook to a second codebook using the one or more correlation matrices;
selecting a preferred vector or a preferred matrix using the second codebook; and
feeding back, to the transmitter, information associated with the preferred vector or the preferred matrix, wherein
calculating the channel matrix comprises:
decomposing the channel matrix into at least two subchannel matrices, and
calculating at least two correlation matrices that correspond to the at least two subchannel matrices.

17. A receiver comprising:
a channel matrix calculator to calculate a channel matrix;
a correlation matrix calculator to calculate one or more correlation matrices corresponding to the channel matrix between the receiver and a transmitter;
a feedback unit to feed back information for the transmitter to reconstruct the one or more correlation matrices;
a codebook transformation unit to transform a first codebook to a second codebook using the one or more correlation matrices; and
a selector to select a preferred vector or a preferred matrix using the second codebook; wherein:
the feedback unit feeds back, to the transmitter, information associated with the preferred vector or the preferred matrix,
the channel matrix calculator decomposes the channel matrix into at least two subchannel matrices, and
the correlation matrix calculator calculates at least two correlation matrices that correspond to the at least two subchannel matrices.

18. The receiver of claim 17, further comprising:
a power normalization unit to normalize a power of sub blocks included in each of the one or more correlation matrices using normalization factors,
wherein the feedback unit feeds back information associated with the normalization factors.

19. The receiver of claim 17, further comprising:
an information generator to generate information for the transmitter to reconstruct the one or more correlation matrices that are associated with a plurality of sub blocks included in each of the one or more correlation matrices.

20. The receiver of claim 17, wherein, where codewords included in the first codebook include at least two vectors, the codebook transformation unit transforms the first codebook to the second codebook by making at least two correlation matrices of the one or more correlation matrices, correspond to the at least two vectors.

21. A transmitter comprising:
an information receiver to receive information for the transmitter to reconstruct one or more correlation matrices corresponding to a channel matrix between a receiver and the transmitter;
a correlation matrix recognition unit to recognize the one or more correlation matrices using the information for the transmitter to reconstruct the one or more correlation matrices;
a codebook transformation unit to transform a first codebook to a second codebook using the at least two correlation matrices; and
a precoder to generate a precoding matrix using a preferred vector or a preferred matrix of the receiver,
wherein the preferred vector or the preferred matrix is selected among from the second codebook.

22. The transmitter of claim 21, further comprising:
a precoder to generate a precoding matrix using the second codebook.

23. The transmitter of claim 21, wherein, where codewords included in the first codebook include at least two vectors, the codebook transformation unit transforms the first codebook to the second codebook by making at least two correlation matrices of the one or more correlation matrices, correspond to the at least two vectors, respectively.

* * * * *